Jan. 22, 1957

G. G. DREW 2,778,978

MULTIVIBRATOR LOAD CIRCUIT

Filed Sept. 19, 1952

INVENTOR
G. G. DREW

BY [signature]

ATTORNEY

United States Patent Office 2,778,978

Patented Jan. 22, 1957

2,778,978

MULTIVIBRATOR LOAD CIRCUIT

Glen G. Drew, Franklin Township, Somerset County, N. J., assignor to Bell Telephone Laboratories, Incorporated, New York, N. Y., a corporation of New York Application September 19, 1952, Serial No. 310,457

13 Claims. (Cl. 317—137)

The present invention relates generally to multivibrator circuits and more particularly to the load impedance arrangement of a multivibrator whereby novel current conditions are produced.

The multivibrator of the present invention comprises a pair of electronic devices arranged in a multivibrator circuit whereby reverse current conditions are produced. The multivibrator may be any one of the so-called "free-running," "bi-stable," "monostable," "flip-flop," "single-shot," etc. types recognizable in the art.

The electronic devices comprising the basic active elements of the multivibrator may be transistors of the point contact or junction or other types and may involve so-called "n" or "p" type current conduction action or combinations of both.

The electronic devices comprising the basic active elements of the multivibrator may also be electron discharge devices, such as vacuum tubes or gas tubes.

The usual well-known by-stable multivibrator, which is chosen as illustrative of the invention, is of the type wherein it is desired that the device remain in one quiescent state until its action is initiated by a voltage pulse or "trigger" which changes the circuit to another quiescent state. Upon energization by a second voltage pulse the circuit reverts to its initial condition. The multivibrator comprises a regenerative feedback arrangement of a pair of electronic devices, where one of the devices is in its so-called "conducting" or "low impedance" condition and the other is in its "non-conducting" or "high impedance" condition. These conditions are generally associated with large and small or no output current respectively. When electron discharge devices are in the non-conducting condition, there is, for all practictal purposes, no output current from the devices. However, when transistors are used there is some output current in the high impedance condition.

Usually the output currents of the devices are used, through the agency of current responsive load impedances, to perform useful tasks. Somtimes, as is particularly the case with transistors, the small but appreciable output current of the high impedance condition may be of sufficient magnitude to falsely operate a device or to falsely perform a task when such is unwanted.

By means of the novel load impedance arrangement of the present invention the high impedance or non-conducting condition of the multivibrator is caused to produce an actual reversal of current through the associated current responsive load impedance. This prevents false indications and is useful further in the event that special use can be made of such a reverse current.

The particular embodiments of the present invention which are shown and described herein as examples of the invention are three in number. On involves transistors, one uses vacuum tubes and one makes use of gas thyratrons.

Specifically, each of the disclosed embodiments shows a multivibrator comprising a pair of electronic devices each having an output electrode and a novel load impedance arrangement which comprises a first load impedance individual to each device (such as a resistance) connecting the output electrode thereof to a direct-current potential (such as positive for electron discharge devices and positive or negative for transistors depending upon whether n or p-type current conduction is involved), a load impedance (such as a resistance) common to both devices and having one terminal thereof connected to a direct-current potential (same as the other one or different but with similar polarity), and a second load impedance individual to each device (such as an electromagnetic relay) and connecting the output electrode thereof to the other terminal of said common load impedance. In a few instances in the appended claims the second load impedance is defined as a "bilateral" impedance. This expression "bilateral" is meant and intended, when used in certain of the claims, to limit the second impedances to that family thereof which present substantially the same impedance to flow of current irrespective of the direction of said current flow therethrough. This arrangement provides a circuit whereby actual reversals of currents are realized in the second load impedances as the multivibrator switches from one condition to the other. The utility of such current reversal is shown in the exemplary embodiments where the reversal is useful in quickly releasing a relay comprising a second load impedance. Such reversal of current could be put to many other uses which will be obvious to those skilled in the art and such uses are not necessarily limited to control of relays.

Bi-stable multivibrators are particularly useful for relay operation because they enable very short pulses which might otherwise be incapable of operating a relay to cause relay operation through the agency of the multivibrator. This, of course, is due to the fact that the multivibrator responds to short pulses and then may dwell in its changed condition long enough to cause relay operation. It will be appreciated, however, that by-stable multivibrators are not the only type of multivibrators which can operate relays in this fashion.

The above-mentioned embodiments of the present invention are described hereinafter in detail in connection with the drawing of which the following are brief descriptions of the figures.

In connection with Fig. 1 no attempt will be made herein to go into a detailed analysis of the physics of solid or surface states of semiconductors. Reference may be made to "Some circuit properties and applications of n-p-n transistors" by R. L. Wallace, Jr., and W. J. Pietenpol at page 530 of the July 1951 issue of "The Bell System Technical Journal" and to "Some Circuit Aspects of the Transistor" by R. M. Ryder and R. J. Kircher at page 367 of the July 1949 issue of "The Bell System Technical Journal" for explanation of the action of certain junction and point contact type transistors in typical circuit applications. Briefly, a transistor, in one of its forms, may be described as a body of semiconductor material having two spaced electrodes called emitter and collector making operative contact therewith and whereby, when suitable circuit connections and potentials are connected to the body and to the emitter and to the collector, emitter current may produce an amplified collector current. Whenever the term "transistor" is used herein and in the claims it is not intended to limit the scope of the term to any particular type of transistor shown, described, mentioned or referred to since the many types which could be used in the present invention will be apparent to those skilled in the art as a result of the exemplary disclosures.

Figure 1:
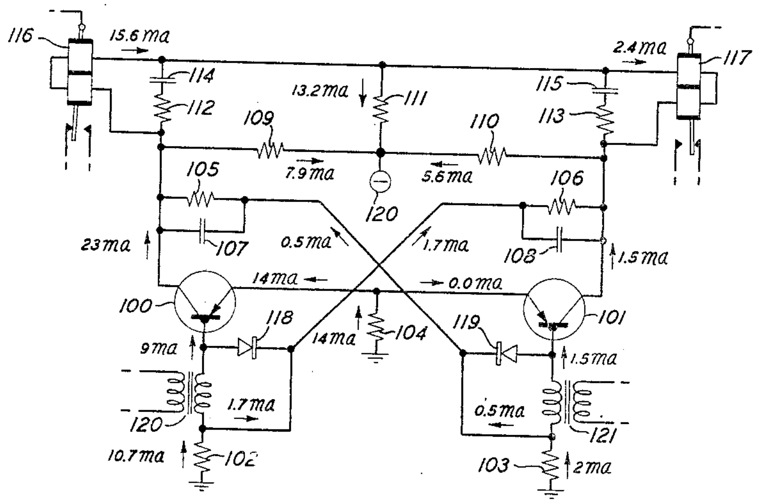
Fig. 1 shows a bi-stable transistor multivibrator.

The circuit of Fig. 1 may be constructed as shown with components of the following suggested values, etc., it being obvious that the components may be changed to suit individual tastes and various operating conditions all within the spirit of the invention.

| | |
|---|---|
| Transistors 100 and 101 | Western Electric Company type A1698 or M1689 point contact n-type transistors. |
| Resistances 102 and 103 | 1,000 ohms. |
| Resistance 104 | 750 ohms. |
| Resistances 105 and 106 | 22,000 ohms. |
| Condensers 107 and 108 | 0.001 microfarad. |
| Resistances 109 and 110 | 15,000 ohms. |
| Resistance 111 | 6,600 ohms. |
| Resistances 112 and 113 | 2,000 ohms. |
| Condensers 114 and 115 | 0.5 microfarad. |
| Relays 116 and 117 | Western Electric Company 276F type mercury contact relays (1,000 ohms each winding). |
| Rectifiers 118 and 119 | Western Electric Company 400A germanium diode-type varistors. |
| Negative battery 120 | 130 volts (positive grounded). |

Figure 2:
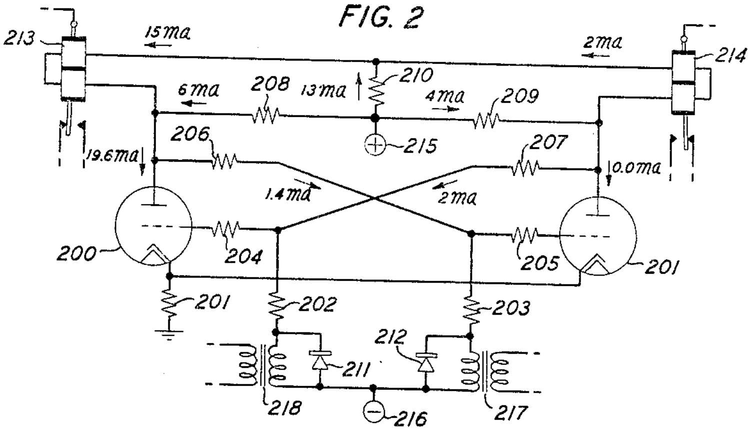
Fig. 2 shows a bi-stable vacuum tube multivibrator.

The circuit of Fig. 2 may be constructed as shown with components of the following suggested values, etc., it being obvious that the components may be changed to suit individual tastes and various operating conditions all within the spirit of the invention.

| | |
|---|---|
| Vacuum tubes 200 and 201 | Western Electric Company 375A beam power tube connected as a triode. |
| Resistance 201 | 410 ohms. |
| Resistances 202 and 203 | 29 000 ohms. |
| Resistances 204 and 205 | 500,000 ohms. |
| Resistances 206 and 207 | 28,000 ohms. |
| Resistances 208 and 209 | 16,500 ohms. |
| Resistance 210 | 5,400 ohms. |
| Rectifiers 211 and 212 | Western Electric Company 400A germanium diode-type varistors. |
| Relays 213 and 214 | Western Electric Company 276F type mercury contact relays (1,000 ohms each winding). |
| Positive battery 215 | 130 volts (negative grounded). |
| Negative battery 216 | 50 volts (positive grounded). |
| Filament excitation | Suitable means. |

Figure 3:
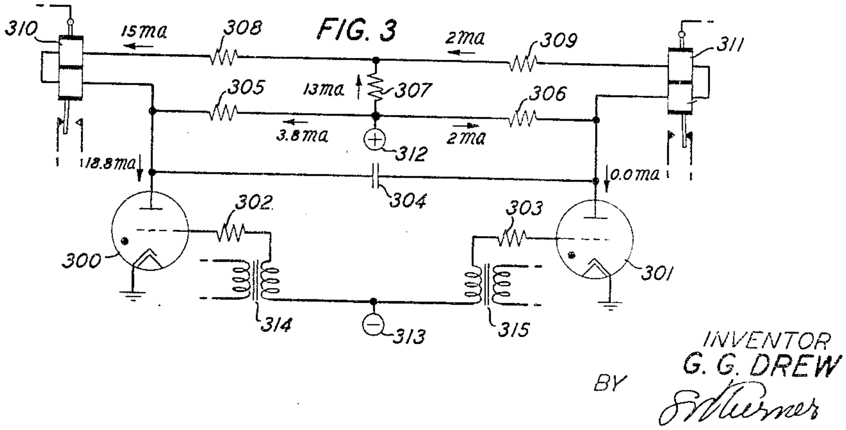
Fig. 3 shows a bi-stable gas tube multivibrator.

The circuit of Fig. 3 may be constructed as shown with components of the following suggested values, etc., it being obvious that the components may be changed to suit individual tastes and various operating conditions all within the spirit of the invention.

| | |
|---|---|
| Gas tubes 300 and 301 | Type 884 thyratrons. |
| Resistances 302 and 303 | 100,000 ohms. |
| Condenser 304 | 0.1 microfarad. |
| Resistances 305 and 306 | 30,000 ohms. |
| Resistance 307 | 3,100 ohms. |
| Resistances 308 and 309 | 2,900 ohms. |
| Relays 310 and 311 | Western Electric Company 276F type mercury contact relays (1,000 ohms each winding). |
| Positive battery 312 | 130 volts (negative grounded). |
| Negative battery 313 | 50 volts (positive grounded). |

The embodiments using electron discharge devices that is Figs. 2 and 3, will be described first in order that the description of the transistor embodiment of Fig. 1 may be considered in the light of its analogy to the more common electron discharge tube circuits and thereby may be more easily understood.

Assuming that vacuum tube 200 of Fig. 2 is conducting and that vacuum tube 201 consequently is non-conducting, the following current conditions will prevail as illustrated by the arrows. Tube 200 will produce about 19.6 milliamperes which flow through resistance 201 to ground. A current of about 6 milliamperes will flow from positive battery 215 (130 volts) and through resistance 208 to the junction point of resistance 206 and the plate of tube 200. About 13 milliamperes flow from battery 215 and through resistance 210. About 15 milliamperes flow through the windings of relay 213 toward the plate of tube 200. About 1.4 milliamperes flow from the plate of tube 200, through resistance 206, through resistance 203, and through the secondary winding of transformer 217, to negative battery 216 (50 volts.) About 4 milliamperes flow from battery 215 and through resistance 209 to the plate of tube 201, which will be producing zero current. About 2 milliamperes flow through the windings of relay 214 away from the plate of tube 201. About 2 milliamperes flow from the plate of tube 201, through resistance 207, through resistance 202, and through the secondary of transformer 218 to negative battery 216.

As the result of these currents the following voltage conditions exist. The upper end of resistance 210 will be about +60 volts. The plate of tube 200 will be at about +30 volts. The plate of tube 201 will be at about +64 volts. The grid of tube 200 will be at about +8 volts. The grid of tube 201 will be at about −9 volts. The cathodes of tubes 200 and 201 will be at about +8 volts. This is a stable condition which will maintain tube 200 conducting and tube 201 non-conducting until some influence external of the circuit is effective to change the situation.

In this condition it is noted that the current through relay 213 is about 15 milliamperes which are more than enough to operate relay 213. The armature of relay 213 is shown making contact with its left-hand contact which represents an operated relay 213. On the other hand, the current through relay 214 is only about 2 milliamperes and is in a reverse direction to that for relay 213. 2 milliamperes are not enough to operate relay 214 and so it is shown released, in which condition its armature makes contact with the right-hand contact.

When a pulse of the proper polarity is applied to the primary of transformer 217 a positive pulse will be developed from top to bottom across the secondary. Rectifier 212, under the action of this positive pulse, will act as a high impedance, whereupon the grid of tube 201 will be driven sufficiently in the positive direction to cause tube 201 to start to conduct. As is well known, this starts a regenerative feedback operation whereby tube 201 becomes conducting and tube 200 becomes non-conducting. Due to the symmetry of the circuit the same final stable current and voltage conditions will exist for the present conditions as did for the initially assumed conditions, except, of course, that the currents and voltages indicated above will be laterally reversed on Fig. 2. The net effect of the changeover is to release relay 213 and to operate relay 214.

Since the current through relay 213 actually reverses in going from 15 milliamperes in one direction to 2 milliamperes in the other direction, the armature bias, whether mechanical, magnetic or electrical, which tends to return the armature to its normal (unoperated relay) position, is assisted by the current reversal. Furthermore, the release will be faster.

A pulse through transformer 218, if of suitable polarity, will cause a positive pulse to be developed from top to bottom across the secondary winding, thereby driving the grid of tube 200 sufficiently in the positive direction to flip the multivibrator over again—tube 200 conducting and tube 201 non-conducting. This will reoperate relay 213 and release relay 214 by a reversal of current therein.

It will be apparent to those skilled in the art that by manipulating the elements of the circuit and their values, etc., the amounts of current through both relays can be changed from those indicated. The elements of the circuit could be arranged so that the currents would be sufficient in either direction to operate a relay, whereupon a polar relay which moves an armature in one of two directions depending upon the direction of current flow could be used.

The rectifiers 211 and 212 shunting the secondaries of transformers 218 and 217 are provided so that any negative pulses (from top to bottom) developed across the secondary windings, due to transients or trailing edges of positive pulses in the primary, etc., will be short-circuited by the rectifiers and thus will be ineffective to control the circuit. This prevents a negative pulse at the wrong time causing conduction to cease in a tube thereby flipping the multivibrator when such action should not take place.

Assuming that gas tube 300 of Fig. 3 is conducting and that gas tube 301 consequently is non-conducting, the following current conditions will prevail. Tube 300 will produce about 18.8 milliamperes. A current of about 3.8 milliamperes will flow from positive battery 312 (130 volts) and through resistance 305 to the plate connection of tube 300. About 13 milliamperes flow from battery 312 and through resistance 307. About 15 milliamperes flow through resistance 308 and through the windings of relay 310 towards the plate of tube 300. About 2 milliamperes flow from positive battery 312 through resistance 306 to the plate of tube 301 and about 2 milliamperes flow from the plate of tube 301 through the windings of relay 311 and through resistance 309. The tube 301, being in the non-conducting condition, is producing for all practical purposes zero current.

As a result of these currents the following voltage conditions exist. The plate of tube 300 will be at approximately +16 volts. The plate of tube 301 will be at approximately +100 volts. The junction point of resistances 307, 308 and 309 will be at approximately +90 volts. This is a stable condition which will maintain tube 300 conducting and tube 301 non-conducting until some influence external to the circuit is effective to change the situation.

In this condition it is noted that the current through relay 310 is about 15 milliamperes which are more than enough to operate relay 310. The armature of relay 310 is shown making contact with its left-hand contact which represents the operated condition of relay 310. On the other hand, the current through relay 311 is only about 2 milliamperes and is in a reverse direction to that for relay 310. 2 milliamperes are not enough to operate relay 311 and so it is shown released, in which condition its armature makes contact with the right-hand contacts.

When a pulse of the proper polarity is applied to the primary of transformer 315, a positive pulse will be developed from top to bottom across the secondary. The grid of tube 301 will be driven sufficiently in the positive direction to cause tube 301 to start to conduct. As is well known, this starts a regenerative feedback operation whereby tube 301 becomes conducting and tube 300 becomes non-conducting. Due to the symmetry of the circuti the same final stable current and voltage conditions will exist for the present conditions as was the case for the initially assumed conditions, except, of course, that the currents and voltages indicated above will be laterally reversed on Fig. 3. The net effect of the changeover is to release relay 310 and to operate relay 311.

Again, as was the case with Fig. 2, the current through relay 310 actually reverses in going from about 15 milliamperes in one direction to about 2 milliamperes in the other direction. The armature bias, whether it be mechanical, magnetic or electrical, which tends to return the armature to its normal unoperated position, is assisted by this current reversal. As a consequence, the release of the relay will necessarily be faster than is the usual case.

Similarly, a pulse through transformer 314, if of suitable polarity, will cause a positive pulse to be developed at the grid circuit of tube 300 and which is sufficient in the positive direction to flip the multivibrator over again—tube 300 again conducting and tube 301 again non-conducting. This will reoperate relay 310 and release relay 311 by a reversal of current therein.

It will be apparent to those skilled in the art that by manipulating or changing the elements of the circuit or their values, etc., the amounts of current through either or both of the relays can be changed from those indicated in the exemplary disclosure. For instance, the values of the components or the components themselves might be changed sufficiently so that the currents would be sufficient in either direction to operate a suitable relay, whereupon such a relay as a polar relay which is arranged to move an armature in one of two directions depending upon the polarity of or the direction of current flow could be used.

It is to be noted that in Fig. 3 no rectifiers, such as rectifiers 211 and 212 of Fig. 2, are used in shunt of the secondary windings of transformers 314 and 315. As is well known in the art of grid-controlled thyratrons, such as tubes 300 and 301, the grid control is effective only to cause conduction through the associated gas tube and that once conduction occurs the grid has no further control over the conducting or non-conducting condition of the tube. Therefore, pulses of the wrong polarity which might be expected to occur in the grid circuits of these thyratrons and which might be of a polarity such as to cut off a conducting tube would not do so in the circuit of Fig. 3 and, therefore, the short-circuiting rectifiers are not necessary.

It may be necessary to point out that in Fig. 2 the regenerative feedback whereby one stable condition of the multivibrator is altered to its other stable condition is by means of the direct-current impedances 206 and 207 connected from the plate of one vacuum tube, such as tube 201 or 200, to the grid circuit of the opposite tube. This, as is well known, may be the case when vacuum tubes are used because the grid of a vacuum tube maintains complete control over the conducting or non-conducting condition of the tube at all times. In Fig. 3, however, since as was pointed out above the grid circuits of the gas tubes lose control during the conducting condition, it is necessary to provide some different type of regenerative feedback for flipping the multivibrator from one condition to the other. This means is shown as a condenser 304 in Fig. 3 whereby, when a non-conducting tube, such as tube 301, is made conducting by virtue of a positive pulse injected into its grid circuit, the plate of such tube 301 undergoes a considerable drop in the negative direction of its plate voltage. Through the agency of condenser 304 this negative-going change at the plate of tube 301 is transferred as a negative-going pulse to the plate of the conducting tube 300. The circuit is arranged, as is well known, such that this negative-going pulse on the plate of tube 300 reduces or lowers or drops the plate voltage of tube 300 sufficiently to extinguish the conduction therein. Once extinguished, tube 300 cannot fire again until a positive pulse is injected into its grid circuit.

The transistor circuit of Fig. 1 is shown as including, by example only, the n-type transistor wherein, for the sake of analysis purposes in view of analogous vacuum tube circuits, such as shown in Fig. 2, the following quantities are conveniently considered as comparable:

| Vacuum Triode | n Transistor |
|---|---|
| Positive plate voltage | Negative collector current |
| Positive plate current | Negative collector voltage |
| Negative grid voltage | Positive emitter current |
| Negative grid current | Positive emitter voltage |

This "duality" of vacuum triodes and transistors is discussed at some length in an article "Duality as a guide in transistor circuit design" by R. L. Wallace, Jr. and G. Raisbeck beginning at page 381 of "The Bell System Technical Journal" for April 1951. The Wallace-Raisbeck article and the above-identified articles of Wallace-Pietenpol and Ryder-Kircher are included among many other interesting articles concerning transistors in the bound volume, "The Transistor," a collection of selected reference materials on characteristics and applications of transistors, prepared by Bell Telephone Laboratories, Incorporated and copyrighted thereby in 1951.

The significance of the signs (positive and negative) used in the above comparison of transistor currents to vacuum tube voltages, and vice versa, refers merely to the assumed positive directions as being those indicated in Fig. 2, for instance. That is: positive plate voltage is plus; positive plate current is from plate to cathode inside the tube; positive grid voltage is plus; positive grid current is from grid to cathode inside the tube; etc. Since the transistor is primarily considered to be a current amplifying device, whereas vacuum tubes are considered as voltage amplifying devices, it is necessary to compare transistor currents to vacuum tube voltages and vice versa. It follows that while the mu ($\mu$) of a tube is the number of volts shift in plate voltage caused by a 1-volt shift in grid voltage, the alpha ($\alpha$) of a transistor is the number of milliamperes shift in collector current caused by a 1-milliampere shift in emitter current.

The subsequent discussion of the action of the circuit of Fig. 1 is based primarily upon what happens rather than why it happens in order to prevent the discussion from wandering too far into the physics of semiconductor theory. There is adequate literature available to the public whereby those desiring a more intimate knowledge of transistor physics may obtain same.

It will suffice here to reiterate that because of the duality between transistors and vacuum tubes it may be stated generally for the purposes of this discussion that while it requires a positive-going grid voltage to cause increased conduction through a vacuum tube and a negative-going grid voltage to cause a decreased conduction, it requires comparable changes in transistor emitter currents to produce comparable changes in transistor collector currents. As will be explained, the necessary changes in emitter current are caused by suitable changes in the voltage or potential conditions on the base electrode of the transistor.

Assuming that transistor 100 of Fig. 1 is in its low impedance or conducting condition and that transistor 101 is in its high impedance or non-conducting condition, the following current conditions will prevail as illustrated in Fig. 1. About 23 milliamperes will flow in a circuit from the collector of transistor 100 to the junction point of resistances 105, 109 and 112. This current is made up of currents from two places; 14 milliamperes flowing from ground through resistance 104 to the collector of transistor 100 through the emitter electrode thereof, and 9 milliamperes flowing through transistor 100 from the base electrode thereof to the collector electrode. About 1.7 milliamperes flow from the top of resistance 102 and through resistance 106 to the junction point of resistances 106, 110 and 113. A total current, therefore, of about 10.7 milliamperes flows from ground up through resistance 102. A current of approximately 0.5 milliampere flows from the top of resistance 103 and through resistance 105 to the junction point of resistances 105, 109 and 112. No current flows in the emitter electrode circuit of transistor 101. A small current of about 1.5 milliamperes, however, flows from the base electrode of transistor 101, to the collector electrode thereof and to the junction point of resistances 106, 110 and 113. Thus, a total current of approximately 2 milliamperes flows from ground up through resistance 103. A current of about 7.9 milliamperes flows from the left-hand side of resistance 109 and through resistance 109 to negative battery 120. A current of approximately 15.6 milliamperes flows from the bottom end of resistance 112, through both windings of relay 116 to the upper end of resistance 111. A current of approximately 13.2 milliamperes flows from the upper end of resistance 111 to negative battery 120. About 2.4 milliamperes flow from the upper end of resistance 111, through both windings of relay 117 to the lower end of resistance 113. A current of about 5.6 milliamperes flows from the right-hand end of resistance 110 and through resistance 110 to negative battery 120.

As a result of these currents, the following voltage conditions exist. The upper end of resistance 104, and thus both emitter electrodes, will be at approximately −10.5 volts. The base electrode of transistor 100 will be at approximately −10.7 volts. The base electrode of transistor 101 will be at about −2 volts. The collector electrode of transistor 100 will be at about −12 volts and the collector electrode of the transistor 101 will be at about −48 volts. The upper end of resistance 111 will be approximately −43.2 volts.

This condition of the multivibrator of Fig. 1 is a stable condition, wherein a relatively large current is produced in the collector circuit of transistor 100 and a relatively small current in the collector circuit of transistor 101. In view of the fact that the base electrode of transistor 101 is appreciably positive with respect to the emitter of transistor 101, this transistor is in its high impedance or non-conducting condition. Actually, transistor 101 conducts slightly (about 1.5 milliamperes), but relative to the large current produced by transistor 101, for all practical purposes transistor 101 is non-conducting. It will be noted that the base electrode of transistor 100 is somewhat negative with respect to the emitter of transistor 100. In fact, the emitter almost follows the base voltage causing the rather substantial emitter current of approximately 14 milliamperes to flow. With this amount of emitter current flowing, the voltage drop across the collector-base of transistor 100 is approximately 1.3 volts with 23 milliamperes flowing. It is further noted that the 15.6 milliamperes flowing through relay 116 are sufficiently large to operate relay 116 which, therefore, has been shown in the operative condition with its armature moved to make contact with the left-hand contact. Likewise, as was the case with Figs. 2 and 3 above discussed, the relatively small current of 2.4 milliamperes flowing through relay 117 is in the reverse direction to the current flowing through relay 116 and, since this current is insufficient to operate relay 117, the latter is shown released with its armature making contact with the right-hand contact. This, as has been mentioned, is a stable condition which will maintain transistor 100 in its low impedance or conducting condition and transistor 101 in its high impedance or non-conducting condition until some influence external of the circuit is effective to change the situation.

When a pulse of the proper polarity is applied to the primary of transformer 121, a negative-going pulse will be developed from top to bottom across the secondary. This drives the base of transistor 101 negative with respect to its emitter and thus changes the voltage at the collector of transistor 101 from about −48 volts to about −12 volts by causing an appreciable increase in collector current. This changes transistor 101 to its low impedance or conducting condition which, by virtue of the coupling resistance 106 and condenser 108 from the collector of transistor 101 to the base of transistor 100, carries the base of transistor 100 more positive than its emitter, thereby changing transistor 100 to its high impedance or non-conducting condition. By means of this regenerative feedback operation the multivibrator of Fig. 1 is changed to the other of its two stable conditions. Due to the symmetry of the circuit, substantially the same final stable current and voltage conditions will exist for the present conditions as did for the initially assumed conditions, except, of course, that the currents and voltages indicated above will be laterally reversed in Fig. 1. The net effect of this change-over is to release relay 116 and to operate relay 117.

As has been mentioned previously with respect to the discussion of Figs. 2 and 3, since the current through relay 116 actually reverses direction through the windings of that relay in going from 15.6 milliamperes in one direction to about 2.4 milliamperes in the other direction, the armature bias, whether it be mechanical, magnetic, electrical, etc., which tends to return the armature to its normal (that is, unoperated) position, is assisted by this current reversal. As a consequence, the release of relay 116 will necessarily be faster than is the usual case.

If a pulse of suitable polarity and magnitude is transmitted through the transformer 120, a similar reversal will take place in the multivibrator circuit of Fig. 1, causing it again to flip over to its original condition wherein transistor 100 is in its low impedance or conducting condition, transistor 101 is in its high impedance or non-conducting condition, relay 116 is operated and relay 117 is released.

It will be obvious to those skilled in the art that by changing or manipulating or rearranging the elements of the circuit and their values, etc., the amounts of current through both relays could be changed from the values indicated. The elements of the circuit could be arranged so that these currents could be sufficient in either direction to operate a relay, whereupon a polar relay, which is arranged to actuate an armature in one of two directions depending upon the direction of current flow could be used.

Rectifiers 118 and 119, which are arranged in shunt of the secondary windings of transformers 120 and 121, are, as has been explained above with respect to Figs. 2 and 3, useful in short-circuiting undesired positive pulses which may be developed across the secondary windings due to one reason or another and which, if permitted to exercise their influence upon the circuit, might cause undesired results.

Two other parts of the circuit of Fig. 1 may be observed for complete understanding of the operation of the circuit. These parts are considered as non-essential parts thereof for successful operations of the multivibrator but do improve the circuit performance. The coupling condensers 107 and 108, shunting the resistances 105 and 106, are merely to provide fast operation by virtue of these condensers comprising a short circuit for the transient pulses transmitted from the collector of one transistor to the base of the other transistor at the start of the change-over operation. Under stable state conditions, these condensers do not affect the currents or voltages as previously described. The series circuits of capacity and resistance shunting the windings of relays 116 and 117, such as condenser 114 and resistance 112 in series across the windings of relay 116, are provided merely to make the combined inductive and resistive circuit, comprising the windings of relay 116, appear to be more nearly a pure resistance.

It is to be understood that the above-described arrangements are merely illustrative of the application of the principles of the invention. Numerous other arrangements may be devised by those skilled in the art without departing from the spirit and scope of the invention.

What is claimed is:

1. In a multivibrator circuit, a pair of electronic devices each having an output electrode and each provided with two other electrodes for controlling current flow internally of said device with respect to said output electrode, a first resistance individual to and operative as an active load for each device and connecting the output electrode thereof to a fixed direct-current potential, a resistance common to and operative as an active load for said devices and having one terminal thereof connected to said fixed direct-current potential, and an electromagnetic relay individual to and operative as an active load for each device, said relay being connected between the output electrode of its associated device and the other terminal of said common resistance.

2. The invention described in claim 1 wherein the said electronic devices are transistors having base and emitter and collector electrodes and the said output electrodes are the collector electrodes of said transistors.

3. The invention described in claim 2 wherein the said transistors are n-type transistors and the said fixed potential is negative with respect to other parts of said multivibrator.

4. The invention described in claim 1, wherein the said electronic devices are electron discharge devices having cathode and grid and plate electrodes, the said output electrodes are the plates of said devices and the said fixed potential is positive with respect to other parts of said multivibrator circuit.

5. The invention described in claim 4 wherein the said discharge devices are vacuum tubes connected as triodes.

6. The invention described in claim 4 wherein the said discharge devices are gas tubes connected as triodes.

7. In a bi-stable multivibrator circuit, a pair of electronic devices each having an output electrode and each provided with two other electrodes for controlling current flow internally of said device with respect to said output electrode, an input circuit individual to each device whereby one stable state may be changed to the other from two control sources, a first resistance individual to and operative as an active load for each device and connecting the output electrode thereof to a fixed direct-current potential, a resistance common to and operative as an active load for said devices and having one terminal thereof connected to said fixed direct-current potential, and an electromagnetic relay individual to and operative as an active load for each device, said electromagnetic relay being connected between the output electrode of its associated device and the other terminal of said common resistance, whereby a reversal of current flow through each relay occurs upon a change from one stable state to the other.

8. The invention described in claim 7 wherein said electronic devices are transistors having base and emitter and collector electrodes and the said output electrodes are the collector electrodes of said transistors.

9. The invention described in claim 8 wherein said transistors are n-type transistors and the said fixed potential is negative with respect to other parts of said multivibrator circuit.

10. The invention described in claim 9 wherein the said input circuits of said transistors include the respective said base electrodes thereof.

11. The invention described in claim 7 wherein said electronic devices are electron discharge devices having cathode and grid and plate electrodes, the said output electrodes are the plates of said devices and the said fixed potential is positive with respect to other parts of said multivibrator circuit.

12. The invention described in claim 11 wherein the said discharge devices are vacuum tubes connected as triodes and the said input circuits of said tubes include the respective said grids thereof.

13. The invention described in claim 11 wherein the said discharge devices are gas tubes connected as triodes and the said input circuits of said tubes include the respective grids thereof.

References Cited in the file of this patent

UNITED STATES PATENTS

| | | |
|---|---|---|
| 2,612,561 | Rea | Sept. 30, 1952 |
| 2,620,400 | Snijders | Dec. 2, 1952 |
| 2,665,845 | Trent | Jan. 12, 1954 |